(12) United States Patent
Fisher et al.

(10) Patent No.: US 9,015,047 B1
(45) Date of Patent: Apr. 21, 2015

(54) AUTOMATIC SPEECH RECOGNITION REPORTING

(75) Inventors: Aaron Scott Fisher, Omaha, NE (US); Prashanta Pradhan, Omaha, NE (US)

(73) Assignee: West Corporation, Omaha, NE (US)

( * ) Notice: Subject to any disclaimer, the term of this patent is extended or adjusted under 35 U.S.C. 154(b) by 1651 days.

(21) Appl. No.: 11/673,667

(22) Filed: Feb. 12, 2007

(51) Int. Cl.
- G10L 15/18 (2013.01)
- G10L 15/00 (2013.01)
- G10L 15/08 (2006.01)

(52) U.S. Cl.
CPC ............................ *G10L 15/08* (2013.01)

(58) Field of Classification Search
None
See application file for complete search history.

(56) References Cited

U.S. PATENT DOCUMENTS

| | | | |
|---|---|---|---|
| 6,292,778 B1 * | 9/2001 | Sukkar | 704/256.4 |
| 6,405,162 B1 * | 6/2002 | Segond et al. | 704/9 |
| 6,609,087 B1 * | 8/2003 | Miller et al. | 703/22 |
| 6,615,178 B1 * | 9/2003 | Tajima | 704/277 |
| 7,080,004 B2 * | 7/2006 | Wang et al. | 704/9 |
| 7,103,542 B2 * | 9/2006 | Doyle | 704/231 |
| 7,295,966 B2 * | 11/2007 | Barklund et al. | 704/9 |
| 7,337,106 B2 * | 2/2008 | Liu | 704/9 |
| 7,383,172 B1 * | 6/2008 | Jamieson | 704/9 |
| 7,548,847 B2 * | 6/2009 | Acero et al. | 704/9 |
| 7,587,307 B2 * | 9/2009 | Cancedda et al. | 704/2 |
| 2002/0133346 A1 * | 9/2002 | Kemble et al. | 704/257 |
| 2002/0138250 A1 * | 9/2002 | Okura et al. | 704/2 |
| 2003/0212543 A1 * | 11/2003 | Epstein et al. | 704/9 |
| 2007/0038436 A1 * | 2/2007 | Cristo et al. | 704/9 |

\* cited by examiner

*Primary Examiner* — Jesse Pullias

(57) ABSTRACT

A method, a computer readable medium and a system for reporting automatic speech recognition that comprises, collecting an utterance, analyzing the utterance, receiving a translation of the utterance, and determining a difference between the analyzed utterance and the translated utterance. An embodiment the disclosure includes updating the utterance analysis based upon the determined difference, correlating the analyzed utterance to the translated utterance and tracking determined difference by a translator. In another embodiment the disclose includes reporting, categorizing, sorting, and grouping the determined difference.

19 Claims, 5 Drawing Sheets

AUTOMATIC SPEECH RECOGNITION REPORTING

CROSS REFERENCE TO RELATED APPLICATIONS

The present patent application is also related to commonly assigned U.S. patent application Ser. No. 11/673,665 entitled AUTOMATIC SPEECH RECOGNITION TAGGING, Ser. No. 11/673,663 entitled AUTOMATIC SPEECH RECOGNITION TUNING MANAGEMENT, filed on even date herewith, the entire contents of each of which are incorporated by reference herein.

FIELD OF THE INVENTION

The embodiment of the disclosure is generally related to enabling an Automatic Speech Recognition (ASR) system to recognize a multitude of spoken strings of words as a single meaning within a speech application and more specifically, to allow reporting of the tuning of automatic speech recognition. ASR speech applications represent a computer system architecture allowing a human end user to interact with a computer by issuing voice commands.

Therefore, what is needed is an ability to analyze a comparison between what has been transcribed and the semantic interpretation grammar to allow tuning.

BACKGROUND OF THE INVENTION

Currently, the creation of an ASR speech application requires significant effort from subject matter experts and grammar developers primarily related to the mapping of potential spoken strings of words (utterances) to specific meanings (semantics). This mapping is referred to as the Reporting process. The Reporting process requires review of all possible combinations of utterances and assignment to a specific semantic upon which a speech application can react. The sample size of potential utterances that must be tagged is large. A meaning report is the comparison of differences between files that have been transcribed and the semantic interpretation grammar. This comparison allows tuning of the semantic interpretation grammar to increase its accuracy.

Therefore, what is needed is a report that compares a transcribed file to an semantic interpretation grammar to allow tuning of the semantic interpretation grammar.

SUMMARY OF THE INVENTION

An embodiment of the disclosure provides a computer system that facilitates comparison reporting between a translation and the semantic interpretation grammar supporting an ASR speech application. The success of a speech application is tied to a system's ability to understand a large list of transcribed utterances or sentences. A system must apply a complex set of rules referred to as Semantic interpretation grammar. This grammar is based on a corpus which is tagged (a corpus is a collection of recorded utterances used for linguistic analysis). Therefore, before the grammar can be developed each line in the corpus must be tagged. The Reporting process is performed by a subject matter expert (SME) who indicates the specific meaning of a sentence. For example, the sentence "I just received my bill today" could indicate "I want to pay my bill" in a bill payment context. In this example, the sentence would be tagged as "PAYBILL".

An embodiment of the disclosure provides a flexible system, implemented in software, which integrates with a transcription system for reporting differences between translated the utterances/sentences and semantic interpretation grammar. In addition, said system provides a graphical user interface (GUI) supporting reporting of the system.

In one embodiment of the disclosure, a method for reporting automatic speech recognition that comprises, collecting an utterance, analyzing the utterance, receiving a translation of the utterance, and determining a difference between the analyzed utterance and the translated utterance.

In another embodiment of the disclosure, a computer readable medium that comprises instructions for, receiving an utterance, transcribing the utterance, receiving a translation of the utterance, determining differences between the transcribe utterance and the translated utterance, and reporting the determined differences.

In yet a further embodiment of the disclosure, a system for reporting automatic speech recognition that comprises, a memory, and a processor communicably coupled to the memory, wherein the processor, receives a transcription of an utterance, receives a translation of the utterance, analyses the differences between the transcription and the translation, and reports the analyzed differences.

DETAILED DESCRIPTION OF THE INVENTION

Figure 1:
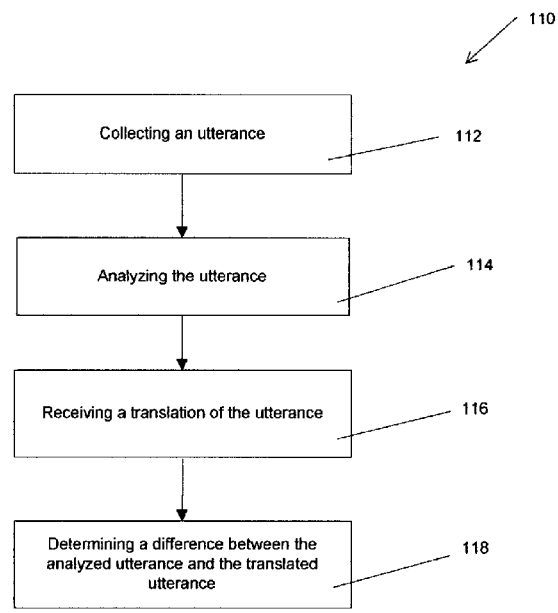
FIG. 1 represents a first method of reporting automatic speech recognition in accordance with an embodiment of the disclosure.

Referring now to FIG. 1, a first method of reporting automatic speech recognition 110 is depicted and comprises a number of blocks or modules that are software, hardware, or firmware, and/or the combination of software, hardware, and/or firmware. A method for reporting automatic speech recognition that comprises, collecting 112 an utterance, analyzing 114 the utterance, receiving 116 a translation of the utterance from a translator, and determining 118 a difference between the analyzed utterance and the translated utterance. The transfer of information occurs via at least one of: a wireless protocol, a wired protocol and a combination of the wireless protocol and the wired protocol.

Figure 2:
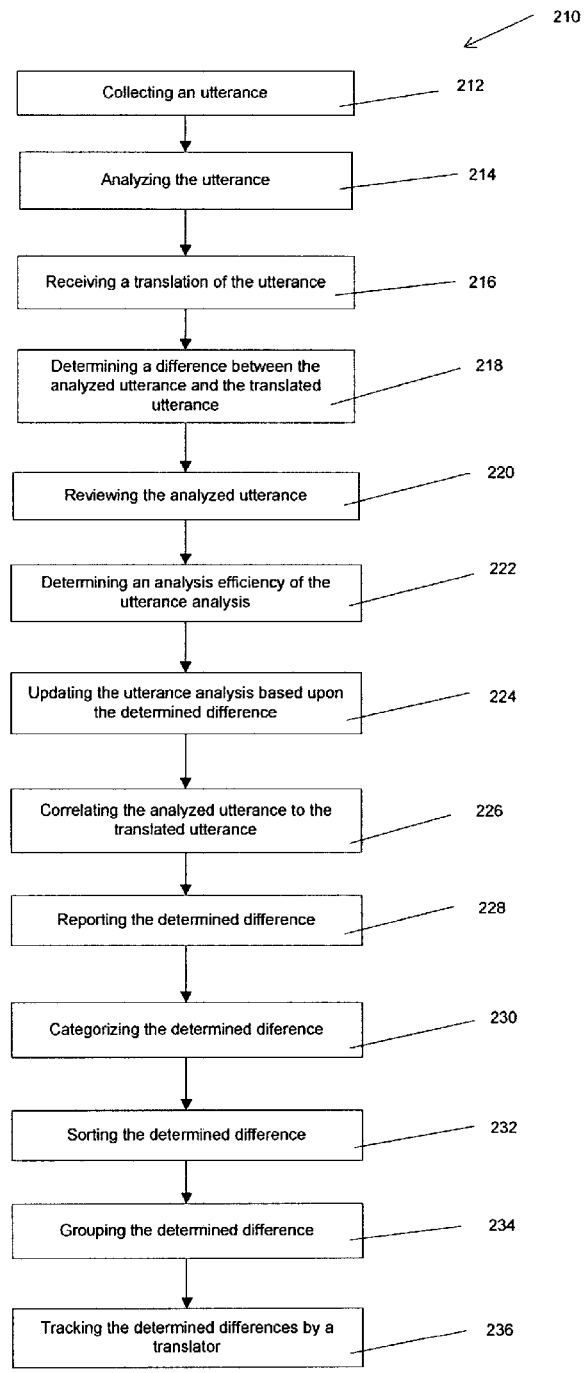
FIG. 2 represents a second method of reporting automatic speech recognition in accordance with an embodiment of the disclosure.

Referring now to FIG. 2, a second method of reporting automatic speech recognition 210 is depicted and comprises a number of blocks or modules that are software, hardware, or firmware, and/or the combination of software, hardware, and/or firmware. A method for reporting automatic speech recognition that comprises, collecting 212 an utterance, analyzing 214 the utterance, receiving 216 a translation of the utterance, and determining 218 a difference between the analyzed utterance and the translated utterance. The method may also comprise reviewing 220 the analyzed utterance, determining 222 an analysis efficiency of the utterance analysis, updating 224 the utterance analysis based upon the determine difference and correlating 226 the analyzed utterance to the translated utterance. The method may additionally comprise reporting 228 the determined difference, categorizing 230 the determined difference, sorting 232 the determined difference, grouping 234 the determined difference and tracking 236 determined difference by a translator. The transfer of information occurs via at least one of: a wireless protocol, a wired protocol and a combination of the wireless protocol and the wired protocol.

Figure 3:
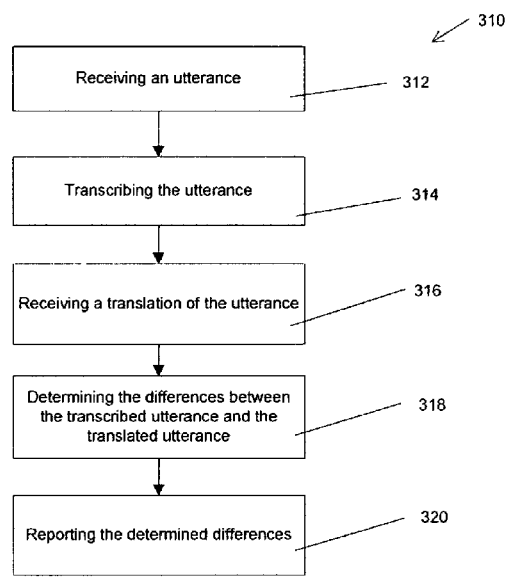
FIG. 3 represents a first computer readable medium in accordance with an embodiment of the disclosure.

Referring now to FIG. 3, a first software flow block 310 of reporting automatic speech recognition is depicted. A computer readable medium that comprises instructions for, receiving 312 an utterance, transcribing 314 the utterance, receiving 316 a translation of the utterance, determining 318 differences between the transcribe utterance and the translated utterance, and reporting 320 the determined differences. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 4:
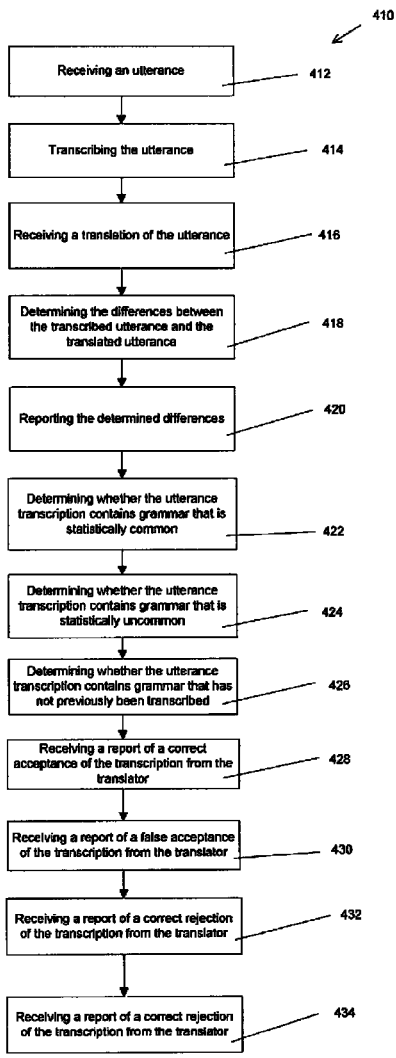
FIG. 4 represents a second computer readable medium in accordance with an embodiment of the disclosure.

Referring now to FIG. 4, a second software flow block 410 of reporting automatic speech recognition is depicted. A computer readable medium that comprises instructions for, receiving 412 an utterance, transcribing 414 the utterance, receiving 416 a translation of the utterance, determining 418 differences between the transcribe utterance and the translated utterance, and reporting 420 the determined differences. The computer readable medium may comprise instructions for determining 422 whether the utterance transcription contains grammar that is statistically common, determining 424 whether the utterance transcription contains grammar that is statistically uncommon and determining 426 whether the utterance transcription contains grammar that has not previously been transcribed. The computer readable medium may additionally comprise instructions for receiving 428 a report of a correct acceptance of the transcription from a translator, receiving 430 a report of a false acceptance of the transcription from a translator, receiving 432 a report of a correct rejection of the transcription from a translator, and receiving 434 a report of a false rejection of the transcription from a translator. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 5:
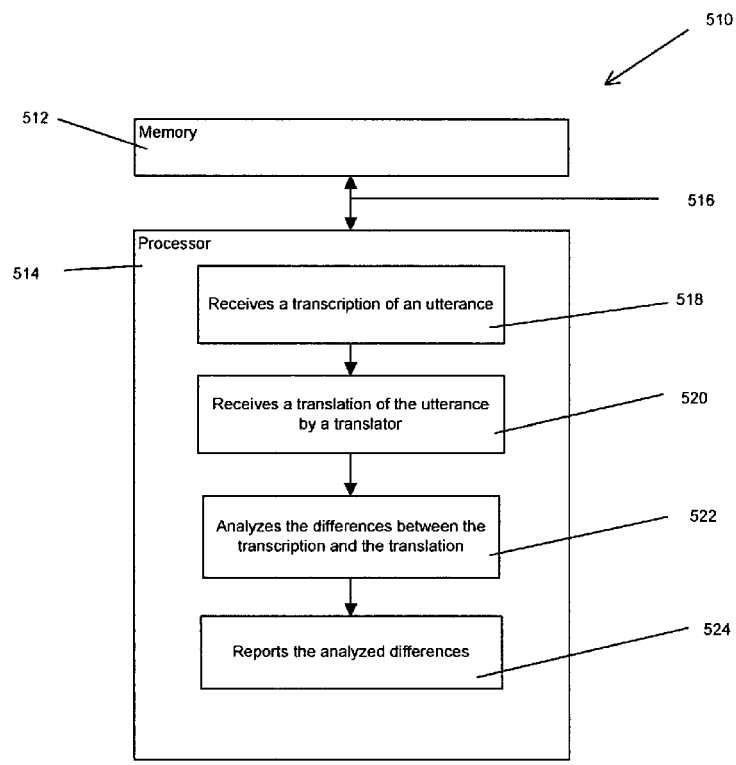
FIG. 5 represents a system of reporting automatic speech recognition in accordance with an embodiment of the disclosure.

Referring now to FIG. 5, a system 510 of reporting automatic speech recognition is depicted. A system for reporting automatic speech recognition that comprises, a memory 512, and a processor 514 communicably coupled 516 to the memory, wherein the processor, receives 518 a transcription of an utterance, receives 520 a translation of the utterance, which may be from a translator, analyses 522 the differences between the transcription and the translation, and reports 524 the analyzed differences. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Systems, methods, devices and computer readable media have been shown and/or described in the above embodiments for reporting automatic speech recognition. Although the above descriptions set forth preferred embodiments, it will be understood that there is no intent to limit the invention by such disclosure, but rather, it is intended to cover all modifications and alternate implementations falling within the spirit and scope of the invention. For example, the embodiment of the disclosure should not be limited to reporting automatic speech recognition. Lastly, the embodiments are intended to cover capabilities and concepts whether they be via a loosely coupled set of components or they be converged into one or more integrated components, devices, circuits, and/or software programs.

What is claimed is:

1. A computer implemented method for reporting automatic speech recognition, comprising:
   collecting an utterance;
   transcribing and analyzing the utterance;
   determining whether the utterance transcription contains grammar that is statistically common;
   determining whether the utterance transcription contains grammar that is statistically uncommon;
   receiving a translation of the utterance;
   determining at least one difference between the analyzed utterance and the translated utterance using a processor; and
   sorting the at least one determined difference, wherein
   the determining whether the utterance transcription contains grammar that is statistically common and the determining whether the utterance transcription contains grammar that is statistically uncommon are separate determinations performed for the utterance transcription.

2. The computer implemented method of claim 1, further comprising:
   reviewing the analyzed utterance.

3. The computer implemented method of claim 1, further comprising:
   determining an analysis efficiency of the utterance analysis.

4. The computer implemented method of claim 1, further comprising:
   updating the utterance analysis based upon the determined difference.

5. The computer implemented method of claim 1, further comprising:
   correlating the analyzed utterance to the translated utterance.

6. The computer implemented method of claim 1, further comprising:
   reporting the determined difference.

7. The computer implemented method of claim 1, further comprising:
   categorizing the determined difference.

8. The computer implemented method of claim 1, further comprising:
   grouping the determined difference.

9. The computer implemented method of claim 1, further comprising:
   tracking the determined difference by a translator.

10. The computer-implemented method of claim 1, further comprising:
    receiving a report of a false acceptance of the transcription from a translator.

11. The computer-implemented method of claim 1, further comprising:
    receiving a report of a false rejection of the transcription from a translator.

12. The computer-implemented method of claim 1, further comprising:
    reporting the determined difference;

categorizing the determined difference;
sorting the determined difference;
grouping the determined difference; and
tracking the determined difference by a translator.

13. The computer-implemented method of claim 1, further comprising:
sorting the determined difference.

14. A non-transitory computer readable medium comprising instructions that, when executed by a processor, cause the processor to perform a method comprising:
receiving an utterance;
transcribing the utterance;
determining whether the utterance transcription contains grammar that is statistically common;
determining whether the utterance transcription contains grammar that is statistically uncommon;
receiving a translation of the utterance;
determining at least one difference between the transcribed utterance and the translated utterance;
sorting the at least one determined difference; and
reporting the at least one determined difference, wherein
the determining whether the utterance transcription contains grammar that is statistically common and the determining whether the utterance transcription contains grammar that is statistically uncommon are separate determinations performed for the utterance transcription.

15. The computer readable medium of claim 14, the instructions further configured to cause the processor perform a method comprising:
determining whether the utterance transcription contains grammar that has not previously been transcribed.

16. The computer readable medium of claim 14, the instructions further configured to cause the processor perform a method comprising:
receiving a report of a correct acceptance of the transcription from a translator.

17. The computer readable medium of claim 14, the instructions further configured to cause the processor perform a method comprising:
receiving a report of a correct rejection of the transcription from a translator.

18. A system for reporting automatic speech recognition, comprising:
a memory; and
a processor communicably coupled to the memory, wherein the processor is configured to:
receive a transcription of an utterance,
determine whether the utterance transcription contains grammar that is statistically common,
determine whether the utterance transcription contains grammar that is statistically uncommon,
receive a translation of the utterance,
analyze at least one difference between the transcription and the translation,
sort the analyzed at least one difference, and
report the analyzed at least one difference, wherein
the determining whether the utterance transcription contains grammar that is statistically common and the determining whether the utterance transcription contains grammar that is statistically uncommon by the processor are separate determinations performed for the utterance transcription.

19. The system of claim 18, wherein the translation is performed by a subject matter expert.

\* \* \* \* \*